United States Patent
Duesterwald et al.

(10) Patent No.: US 12,536,464 B2
(45) Date of Patent: Jan. 27, 2026

(54) SYSTEM FOR CONSTRUCTING EFFECTIVE MACHINE-LEARNING PIPELINES WITH OPTIMIZED OUTCOMES

(71) Applicant: International Business Machines Corporation, Armonk, NY (US)

(72) Inventors: Evelyn Duesterwald, Yorktown Heights, NY (US); Martin Hirzel, Yorktown Heights, NY (US); Darrell Reimer, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1378 days.

(21) Appl. No.: 16/262,443

(22) Filed: Jan. 30, 2019

(65) Prior Publication Data

US 2020/0242510 A1 Jul. 30, 2020

(51) Int. Cl.
*G06N 20/00* (2019.01)
*G06F 16/903* (2019.01)

(52) U.S. Cl.
CPC ....... *G06N 20/00* (2019.01); *G06F 16/90335* (2019.01)

(58) Field of Classification Search
CPC .......................... G06N 20/00; G06F 16/90335
See application file for complete search history.

(56) References Cited

U.S. PATENT DOCUMENTS

| | | | |
|---|---|---|---|
| 2011/0313953 A1* | 12/2011 | Lane | G06N 20/10 706/12 |
| 2017/0193392 A1* | 7/2017 | Liu | G06N 20/00 |
| 2018/0067732 A1 | 3/2018 | Seetharaman et al. | |
| 2019/0018866 A1* | 1/2019 | Ormont | G06F 9/3897 |
| 2019/0188605 A1* | 6/2019 | Zavesky | G06N 20/00 |

FOREIGN PATENT DOCUMENTS

| | | |
|---|---|---|
| CN | 104838355 A | 8/2015 |
| CN | 105978704 A | 9/2016 |
| WO | WO 2017/189725 | 11/2017 |

OTHER PUBLICATIONS

Olson, Randal, Evaluation of a Tree-based Pipeline Optimization Tool, ACM ISBN 978-1-4503-4206-3/16/07. (Year: 2016).*
Koehrsen Will, Hyperparameter Tuning the Random Forest in Python (Year: 2018).*
Doyle, Patrick AI Qual Summary Search Method (Year: 1997).*
Ian Gemp, Automated Data Cleansing through Meta-Learning (Year: 2017).*
Scikit-Learn, 4.1. Pipelines and composite estimators, Version 0.20.0 (Year: 2018).*
How to Build a Machine Learning Pipeline with Scikit-learn (Year: 2022).*

(Continued)

*Primary Examiner* — Stephen S Hong
*Assistant Examiner* — Carl E Barnes, Jr.
(74) *Attorney, Agent, or Firm* — James L. Olsen

(57) ABSTRACT

A system, apparatus and a method for constructing pipelines, including enumerate a subspace of valid integrated pipelines, collecting a set of metrics for each of the plurality of pipelines, reducing the set of metrics to a single metric, selecting a final integrated pipeline from among the valid integrate pipelines based on reduced metric.

20 Claims, 13 Drawing Sheets

(56) References Cited

OTHER PUBLICATIONS

Sklearn.metrics.f1_scored scikit-learn 0.20.0 documentation, Version 0.20. (Year: 2018).*
Mel, et al. "The NIST Definition of Cloud Computing". Recommendations of the National Institute of Standards and Technology, Nov. 16, 2015.
Feurer, M. et al., "Efficient and Robust Automated Machine Learning" Department of Computer Science University of Freiburg, Germany. 2017.
Zinkevich, M., "Rules of Machine Learning: Best Practices for ML Engineering" 2016.
Malik, S. et al., "A Visual Analytics Approach to Comparing Cohorts of Event Sequences" Doctor of Philosophy, 2016.
Grano, G. et al., "How High will it be? Using Machine Learning Models to Predict Branch Coverage in Automated Testing" University of Zurich, Department of Informatics, Switzerland, IEEE 2018.
Kalavri, V. "Performance Optimization Techniques and Tools for Distributed Graph Processing" School of Information and Communication Technology, KTH Royal Institute of Technology Stockholm, Sweden 2016 and Institute of Information and Communication Technologies, Electronics Applied Mathematics Universite Catholique de Louvain Louvain-la-neuve, Belgium, 2016.
Chinese Office Action, dated Apr. 20, 2023, in Chinese Application No. 202010054732.4 .

* cited by examiner

SYSTEM FOR CONSTRUCTING EFFECTIVE MACHINE-LEARNING PIPELINES WITH OPTIMIZED OUTCOMES

BACKGROUND OF THE INVENTION

Field of the Invention

The disclosed invention relates generally to an embodiment of a system and method of pipelines, and more particularly, but not by way of limitation, relating to a system, apparatus and method for constructing effective machine-learning pipelines with optimized outcomes.

Description of the Background Art

Machine learning models are typically constructed using complex training pipelines with many stages (e.g., stages for feature extraction and training). New pipeline stages and transformations that improve the overall training pipeline continue to emerge.

For example, there are model de-biasing and hardening for security, hyperparameter tuning, compression, and model tuning for performance. One refers to these emerging additional pipeline stages as pipeline value-adds. Each pipeline value-add comes with its own objective function to measure the provided target value. For example, the value of hyperparameter tuning is measured as accuracy, value of compression is measured as size reduction, etc.

Given a set of pipeline value-adds, creating an effective pipeline is a multi-objective optimization problem. Therefore, there is a need to obtain a more efficient system and method to create an effective pipeline.

SUMMARY OF INVENTION

In view of the foregoing and other problems, disadvantages, and drawbacks of the aforementioned background art, an exemplary aspect of the disclosed invention provides a system, apparatus and method for constructing effective machine-learning pipelines with optimized outcomes.

One aspect of the present invention is to provide a method of constructing pipelines, including enumerating a subspace of valid integrated pipelines, collecting a set of metrics for each of the plurality of pipelines, reducing the set of metrics to a single metric, and selecting a final integrated pipeline from among the valid integrate pipelines based on reduced metric.

Another aspect of the present invention provides system for generating discriminable data, including a memory storing computer instructions, and a processor configured to execute the computer instructions to enumerate a subspace of valid integrated pipelines, collect a set of metrics for each of the plurality of pipelines, reduce the set of metrics to a single metric, and select a final integrated pipeline from among the valid integrate pipelines based on reduced metric.

Another example aspect of the disclosed invention is to provide computer program product comprising a computer readable storage medium having program instructions embodied therewith, the program instructions readable and executable by a computer to cause the computer to perform a method, including enumerate a subspace of valid integrated pipelines, collect a set of metrics for each of the plurality of pipelines, reduce the set of metrics to a single metric; and select a final integrated pipeline from among the valid integrate pipelines based on reduced metric.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF DRAWINGS

The exemplary aspects of the invention will be better understood from the following detailed description of the exemplary embodiments of the invention with reference to the drawings.

DETAILED DESCRIPTION OF PREFERRED EMBODIMENTS

Figure 1:
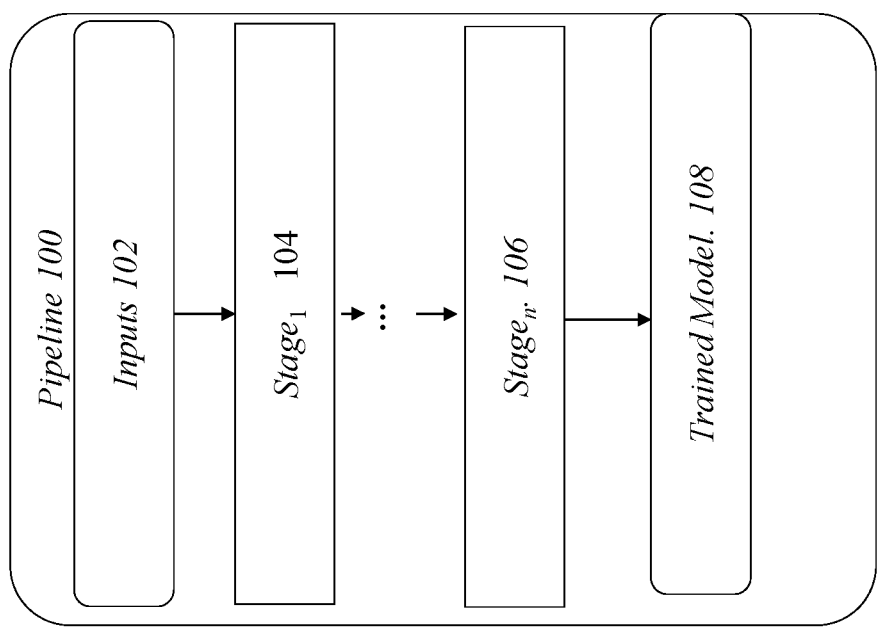
FIG. 1 illustrates a pipeline.

The invention will now be described with reference to the drawing figures, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

As mentioned, machine learning models are typically constructed using complex training pipelines with many stages, for example, for feature extraction and training. FIG. 1 illustrates a pipeline. The pipeline 100 can include stages 1 to n to provide a trained model 108. For example, in the pipeline 100, inputs 102 are sent to the stage 1 (104) and then can go to stage n (106) to provide a trained model 108.

The emerging additional pipeline stages or pipeline value-adds 104 to 106, can come with their own objective function to measure the provided target value. For example, the value of hyperparameter tuning is measured as accuracy, value of compression is measured as size reduction, etc. Given a set of pipeline value-adds, creating an effective pipeline is a multi-objective optimization problem.

Some of the problems addressed by the present invention are as follows. Given a set of pipeline value-adds, create an ordering of the value-adds for an integrated training pipeline that solves (approximates) the multi-objective optimization problem subject to the following. Value-adds may conflict where a values-add can have side-effects that conflict with another value-add's objective function. For example, a compression value-add will reduce model size which may have the adverse effect of degrading accuracy, an objective function of other value-adds such as hyperparameter tuning. The value-adds may be synergistic, where one value-add's effect can create more favorable conditions for another value-add. For example, the compression value-add may improve regularization and thus reduce over-fitting.

The process of integrating a value-add into an existing pipeline is referred to as a pipeline transformation. Each pipeline transformation integrates at least one value-add by adding, removing, or modifying pipeline stages. For a given set of value-adds, an integrated training pipeline results as a series of pipeline transformations to progressively integrate each value-add.

Figure 2:
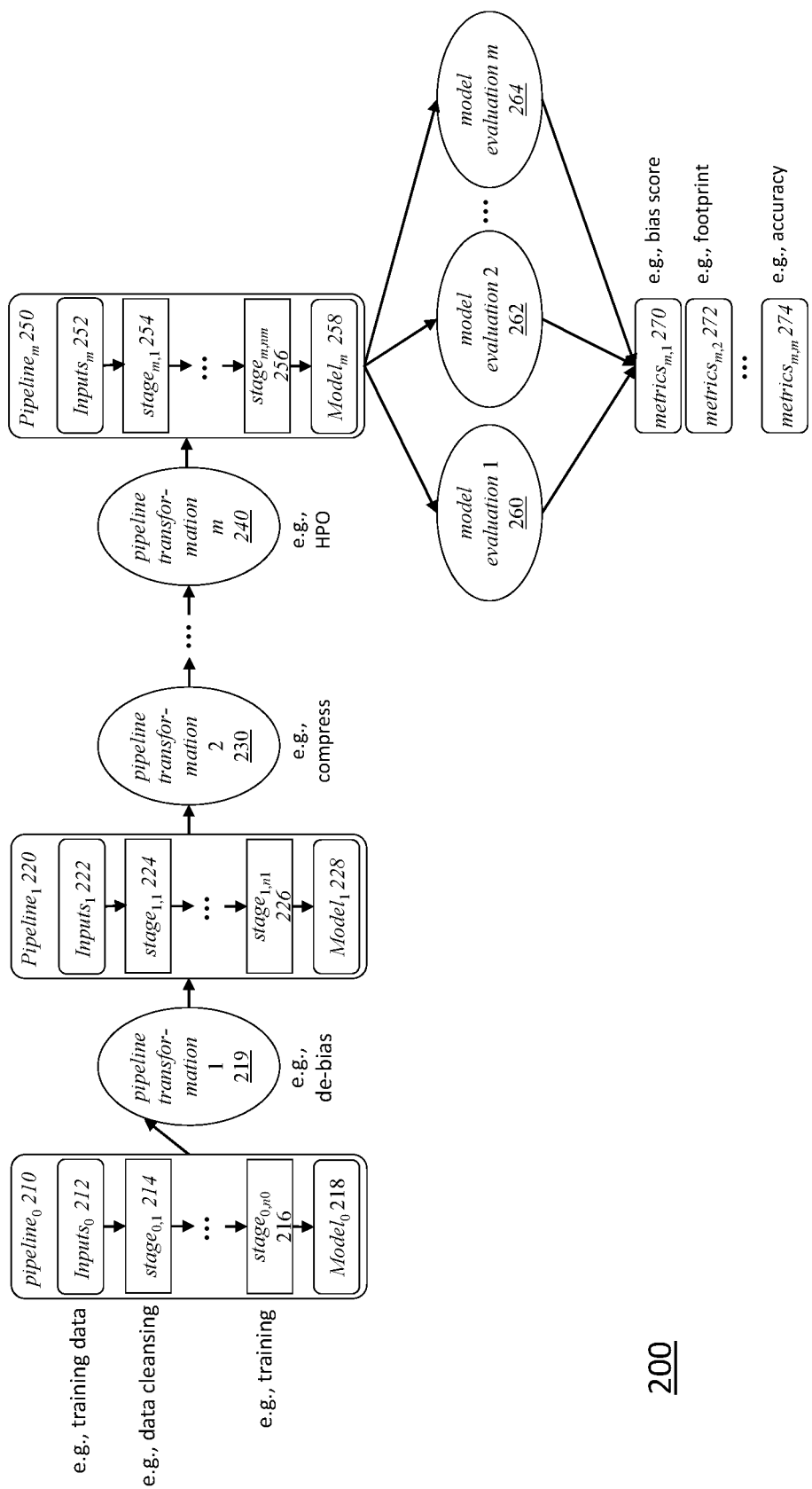
FIG. 2 is an illustration of constructing pipelines in an example embodiment.

FIG. 2 is an illustration of constructing pipelines in an example embodiment. Each integrated value-add or stages 214, 216, 224, 226, 254, 256 includes the following. The integrated value-add 214, 216, 224, 226, 254, 256 includes one or more objective functions, each with an associated metric and optional lower and upper bounds, such that the objective is to maximize the metric value within the lower and upper bound (e.g., for compression value-add, one of the objective functions is inference latency and upper bound could be, for example, 1 second).

The integrated value-add also includes one or more side effect functions with an associated metric and optional lower and upper bounds, (e.g., for compression value-add, an accuracy loss would be a side effect function with an upper bound of, for example, 5%—tolerate at most 5% accuracy loss).

The integrated value-add also has the overall pipeline metrics to include the objective and side-effect metrics for each integrated value-add. A problem to solve is to find an integrated pipeline that yields optimal pipeline metrics at the final pipeline stage.

The pipelines 210, 220, 250 can include inputs 212, 222, and 252 respectively. The inputs 212, 222, and 252 can be, for example, training data. The stages 214, 224 and 254, can be for example, data cleansing. The stages 216, 226 and 256, can be for example, training. For example, pipeline 210 goes to $stage_{0,1}$ 214. The plurality of stages can be added to where it leads to $stage_{0,n0}$ 216. After $stage_{0,n0}$ 216, the system 200 generates trained $model_0$ 218. Trained models 218, 228 and 258 are generated in $pipeline_0$ 210, $pipeline_1$ 220, $pipeline_m$ 250. There are pipeline transformations between the pipelines. For example, there is a pipeline transformation 1 (219) between $pipeline_0$ 210 and $pipeline_1$ 220. There is also pipeline transformation 2 (230) to pipeline transformation "m" 240 after $pipeline_1$ 220. Pipeline transformation 1 (219), can be for example, de-biasing, pipeline transformation 2 (230), can be for example, to compression, and pipeline transformation 3 (240), can be for example, HPO (hyperparameter optimization).

After $pipeline_m$ 250, there is model evaluation 1 (260), model evaluation 1 (262), and model evaluation 1 (264), which leads to $metrics_{m,1}$ 270, $metrics_{m,2}$ 272, $metrics_{m,m}$ 274. The $metrics_{m,1}$ can be, for example, a bias score. The $metrics_{m,2}$ 272 can be, for example, a memory footprint metric. The $metrics_{m,m}$ 274, can be, for example, an accuracy metric.

Figure 3:
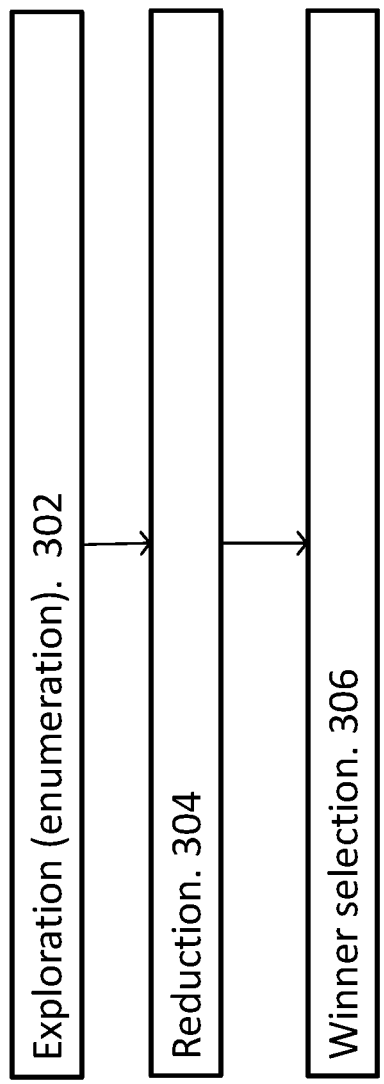
FIG. 3 illustrates base method of the example embodiment.

The base method includes the following general steps as illustrated in FIG. 3. In the step one 302 of exploration or the enumeration step, given a set of N value-adds, enumerate the set of valid integrated pipelines. An integrated pipeline is valid, if all provided lower or upper bounds on associated metrics are satisfied. The system 200 uses exhaustive exploration of pipeline transformations to generate, evaluate and retain all possible valid pipeline candidates.

In the second step of reduction 304, the system 200 uses a weighted function to bring the aggregate of objective and side-effect metrics down to a single combined objective metric.

Then in step 3 there is a winner selection 306, where the system 200 orders the integrated pipelines in the set by the single combined metric and selects the optimal one based on that metric.

Figure 4:
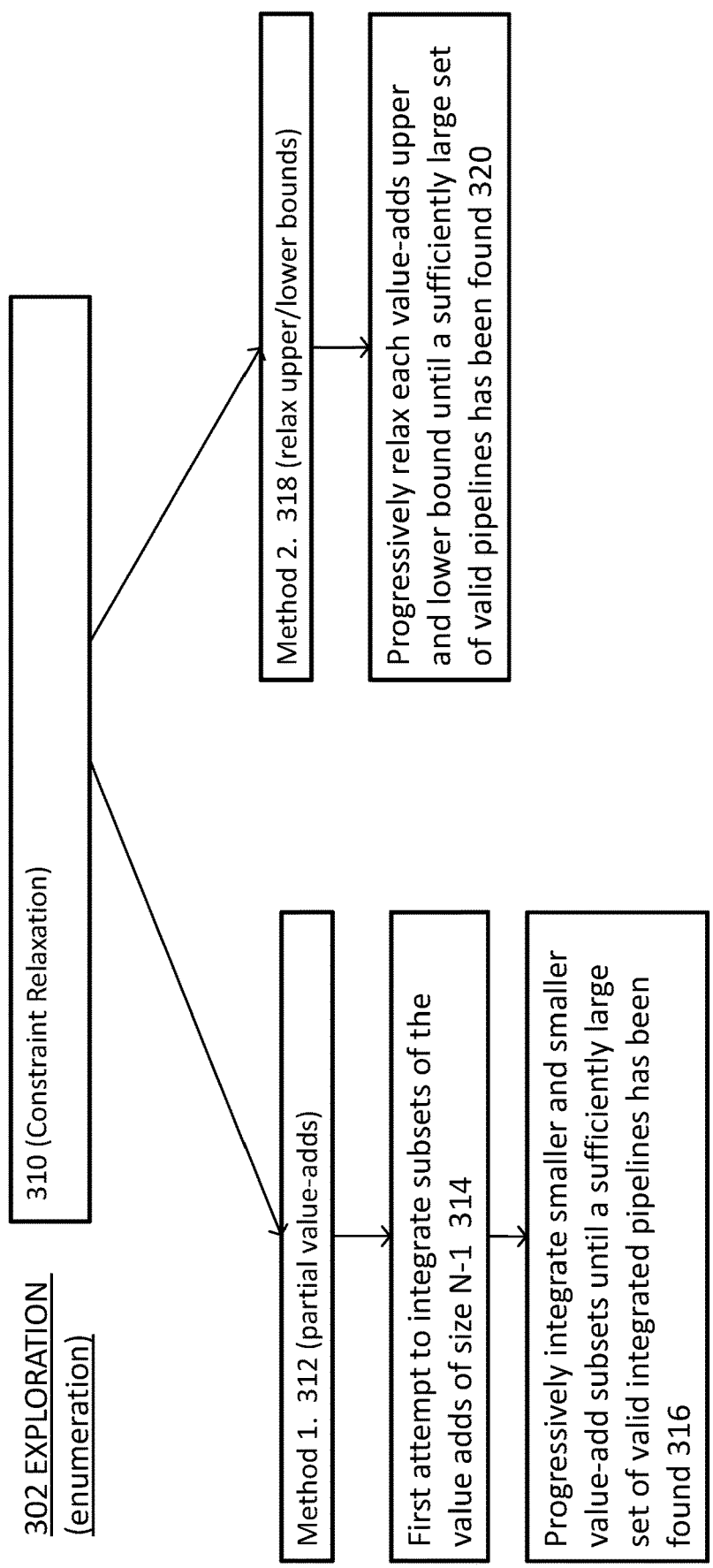
FIG. 4 illustrates a first enhancement to the exploration step.

FIG. 4 illustrates a first enhancement to the exploration (enumeration) step 302. The Enhancement I to Exploration 302, the system performs Constraint Relaxation 310. If the base method in step 1 of exploration 302 yields an empty set of valid integrated pipelines, the system enhances the enumeration process as follows.

There is Method 1 in step 312 which can be called as partial value-adds. The system 200 includes in the enumeration pipelines that only partially integrate the set of N value adds. The first attempt is to integrate subsets of the value adds of size N−1 in step 314. Then, the system 200 progressively integrates smaller and smaller value-add subsets, yielding progressively smaller pipelines until a sufficiently large set of valid integrated pipelines has been found 316.

There is also Method 2 of relaxing upper/lower bounds 318, where the system 200 progressively relaxes each value-adds upper and lower bound until a sufficiently large set of valid pipelines has been found 320.

Figure 5:
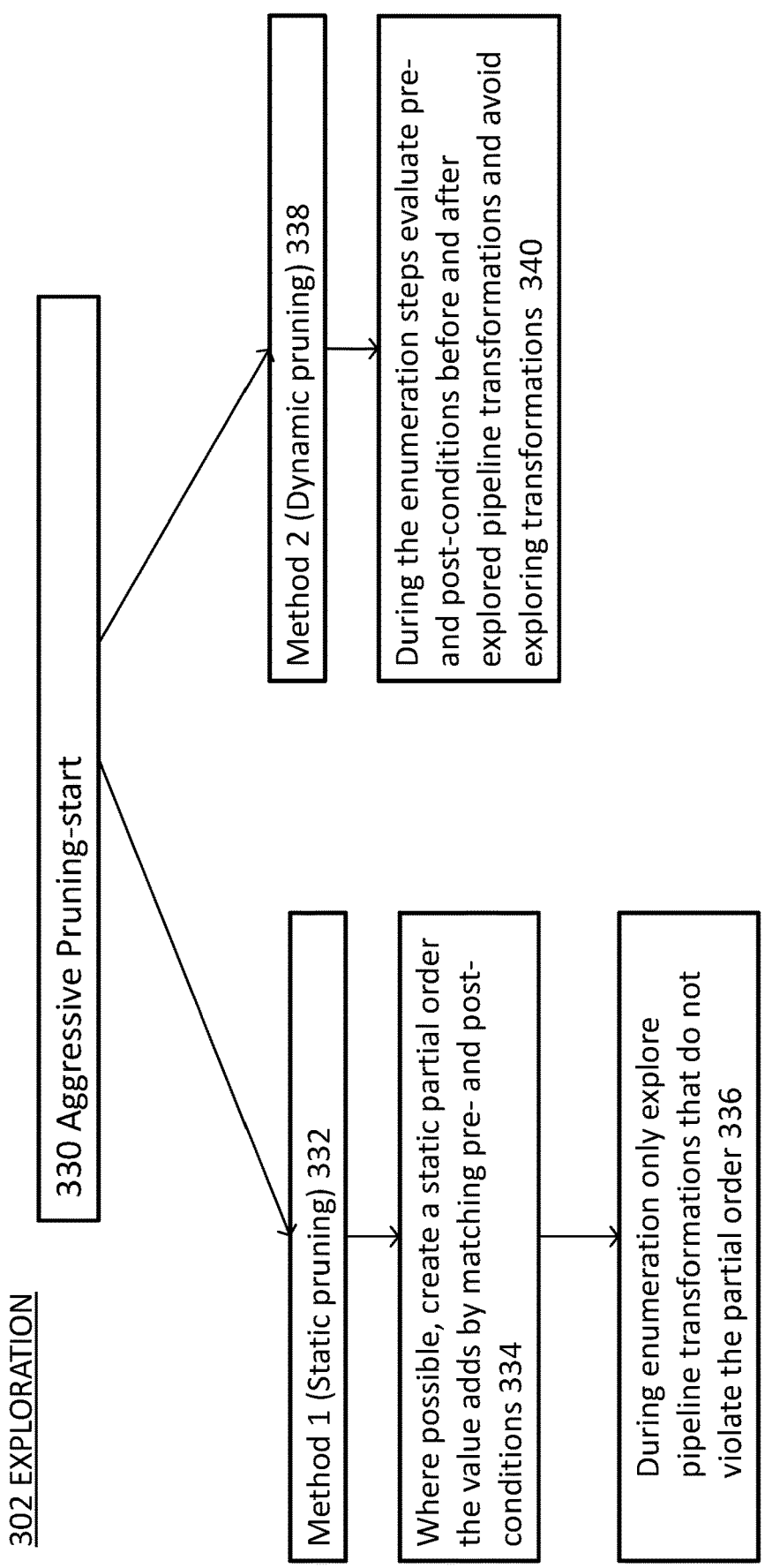
FIG. 5 illustrates a second enhancement to the exploration step of an example embodiment.

FIG. 5 illustrates a second enhancement to the exploration step of an example embodiment. This second enhancement can also be called aggressive pruning 330 with two different methods of the aggressive pruning.

To speed up the enumeration step or the exploration step (Step 302) in the base method (FIG. 3), the system 200 can use pruning of explored pipeline transformation paths as seen in FIG. 5.

The system 200 establishes for each value-add pre- and post-conditions which are upper or lower bounds on one or more associated metrics. Pre-conditions express minimum or maximum metrics values that have to be satisfied in order to apply the value-add (e.g., for robustness checking the accuracy of the model has to be at least 60%).

Post-conditions express necessary effect on the respective metrics as a result of apply the value add (e.g., for compression, the size of the model will be smaller than it was before applying compression).

In a first method of the aggressive pruning, the system starts static pruning 332 from where possible, the system 200 creates a static partial order the value ads by matching pre- and post-conditions 334. During enumeration steps, the system 200 uses the partial order to guide the enumeration by avoiding to explore pipeline transformations that violate the computed partial order 336.

A second method of the aggressive pruning is to start dynamic pruning 338. During the enumeration steps, the system 200 evaluates pre- and post-conditions before and after explored pipeline transformations and avoid exploring transformations that do not have enabled pre-conditions 340.

Figure 6:
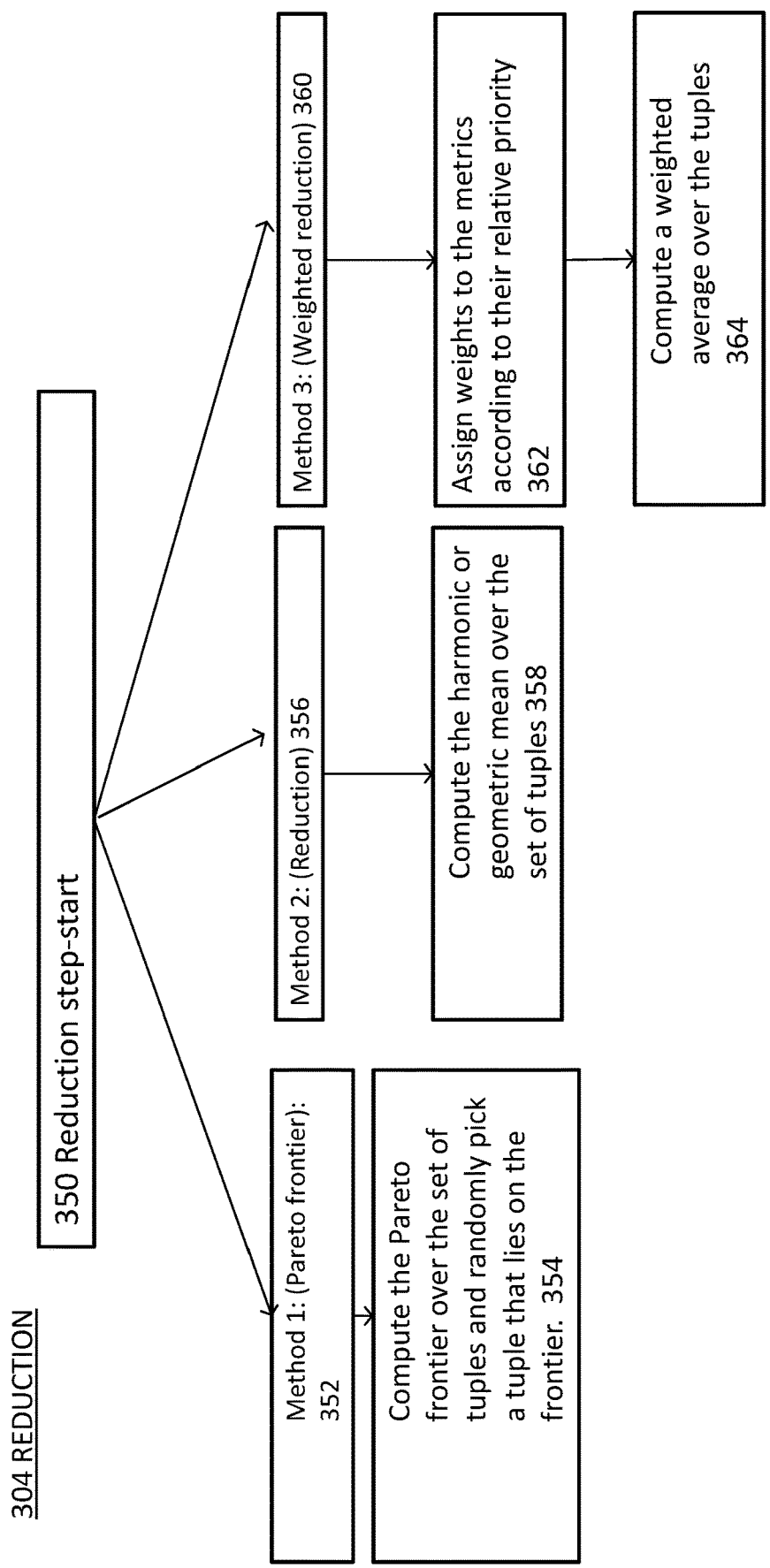
FIG. 6 illustrates details of the reduction step of the base method of an example embodiment.

FIG. 6 illustrates details of the reduction step (second step 304) of the base method (FIG. 3) of an example embodiment. The reduction step 304 starts at 350. Then, there are three example methods shown.

The first step 302 of the base method yields a set of integrated pipelines. For each integrated pipeline, there are a set of N (normalized) metrics yielding a tuple (v1, ... vN) of metric values. An example is metrics are accuracy and size, normalized to a percentage, for two integrated pipelines we may have values (0.95, 0.8) and (0.92, 0.89).

In a first method (Pareto frontier) 352: the system 200 computes the Pareto frontier (or Pareto set) over the set of tuples and randomly pick a tuple that lies on the frontier 354.

A second step is called reduction 356, where the system 200 computes the harmonic or geometric mean over the set of tuples 358. A third step is called weighted reduction 360, where the system 200 assigns weights to the metrics according to their relative priority 362. For example, if accuracy is more important to the AI engineer than size the weights may be assigned as: 75% for accuracy and 25% for size. Then, the system 200 computes a weighted average over the tuples.

Please note that all the steps shown are not necessarily in the order provided. The example steps shown can be in a different order. Any one of the mentioned steps can also be performed at the same time as another step. The steps shown are only an example.

Figure 7:
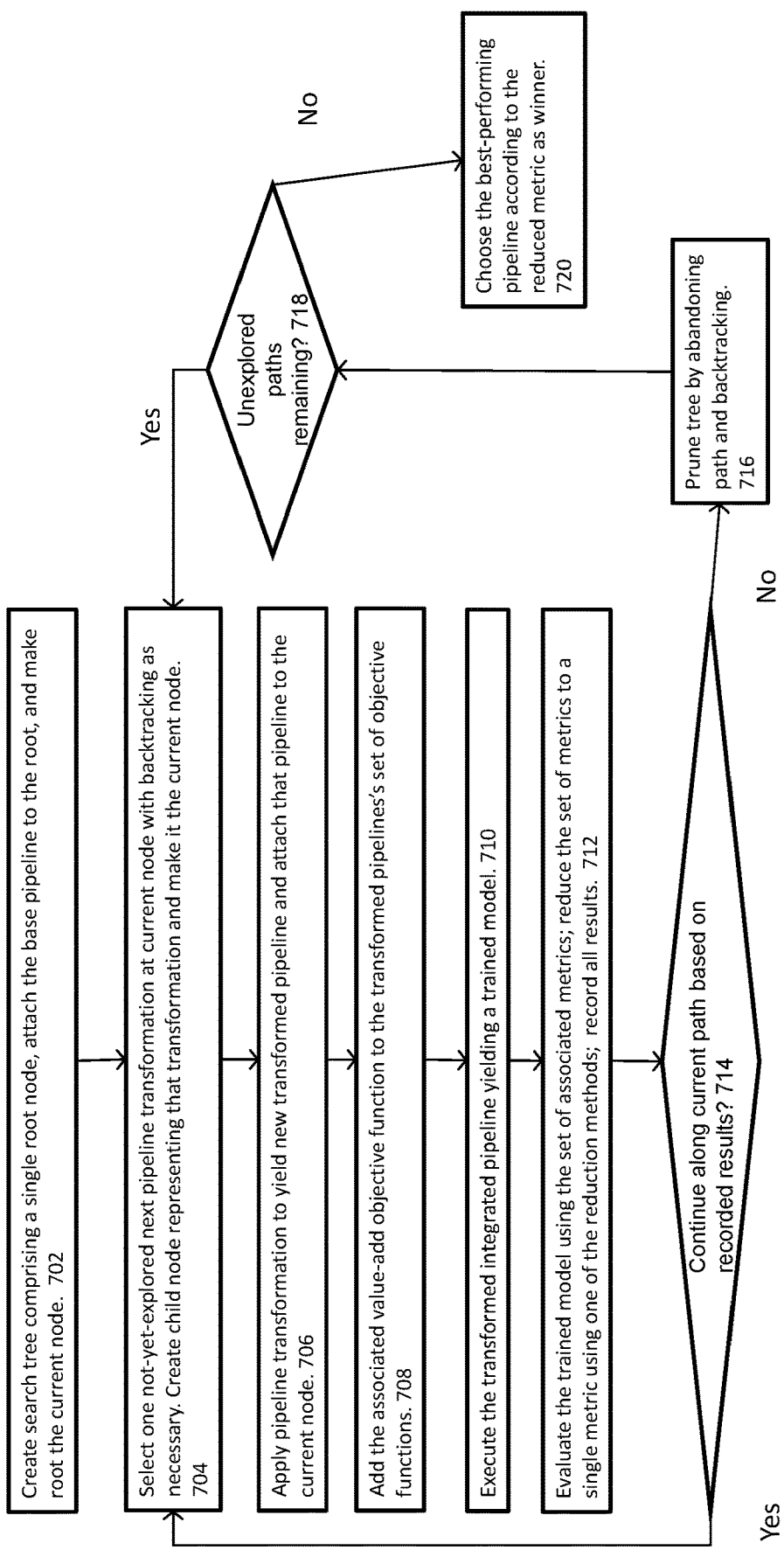
FIG. 7 illustrates an example embodiment via empirical search.

FIG. 7 illustrates an example embodiment via empirical search. The system 200 creates a search tree comprising a single root node, attach the base pipeline to the root, and makes root the current node 702. The system 200 then selects one not-yet-explored next pipeline transformation at current node with backtracking as necessary. The system 200 then creates a child node representing that transformation and make it the current node 704. The system 200 then applies pipeline transformation to yield new transformed pipeline and attach that pipeline to the current node. 706. Thereafter, the system 200 adds the associated value-add objective function to the transformed pipelines's set of objective functions 708. Then the system executes the transformed integrated pipeline yielding a trained model 710. The system 200 evaluates the trained model using the set of associated metrics, reduce the set of metrics to a single metric using one of the reduction methods, record all results. 712.

The system 200 then checks whether to continue along current path based on recorded results in step 714. If the decision is "yes", then the system 200 goes back to step 704 (i.e., select one not-yet-explored next pipeline transformation at current node with backtracking as necessary, and create child node representing that transformation and make it the current node 704). If the decision in step 714 is "no", then the system 200 goes to prune the search tree by abandoning the current path and backtracking 716. The system checks to see whether there are any unexplored paths remaining 718. If yes, then the system 200 goes back to step 704 (i.e., select one not-yet-explored next pipeline transformation at current node with backtracking as necessary, and create child node representing that transformation and make it the current node 704). However, if the decision in step 718 is "no", then choose the best-performing pipeline according to the reduced metric as winner or selection 720.

The above examples embody enabling technologies such as, machine learning pipelines, model evaluations and metrics, pipeline transformations, search pruning, and many other technologies.

The system 200 of the present invention can be configured in various forms. The following shows a plurality of examples in which system 200 can be configured as. In addition to the examples of the system 200 shown, there can also be included specialized integrated circuit chips configured to process or co-process the techniques shown above.

Figure 8:
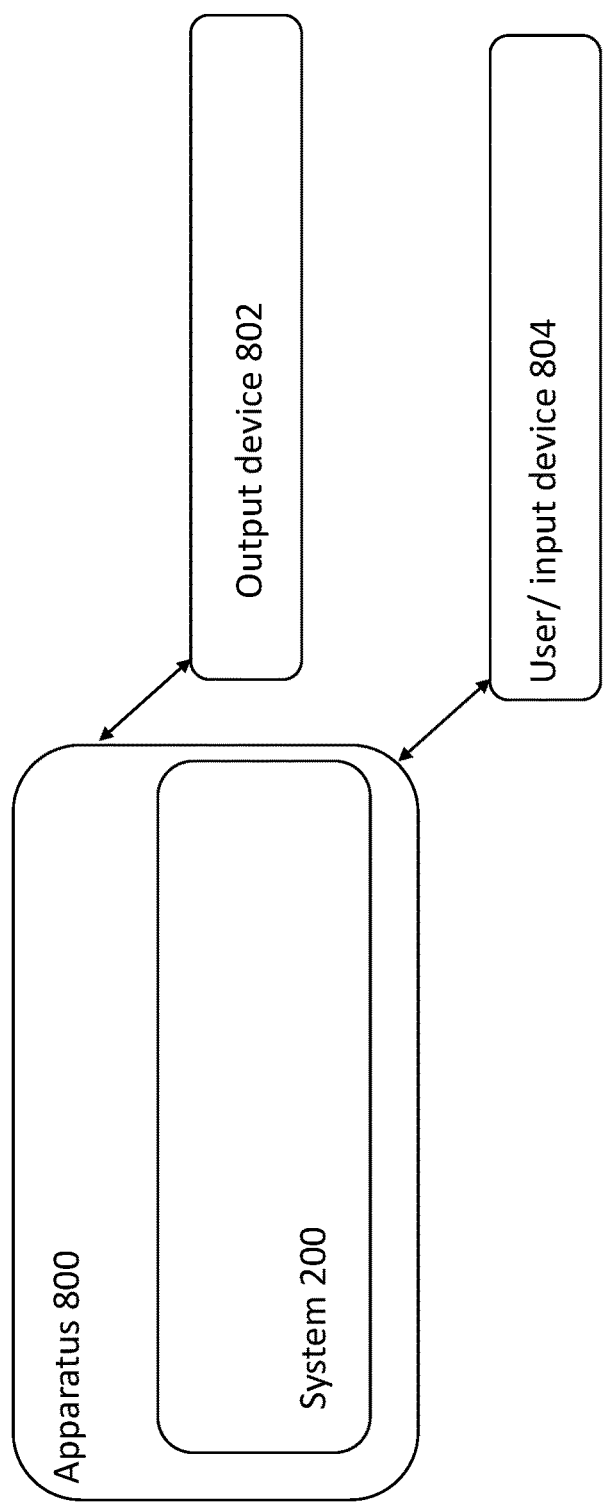
FIG. 8 illustrates an example hardware configuration of the system.

FIG. 8 illustrates an example hardware configuration of the system. The apparatus 800 can include the system 200 which takes inputs from the input device or user 804 for use in the pipelines 210 to 250 of FIG. 2. The winner selection 306 of FIG. 3 is output to the output device 802.

Figure 9:
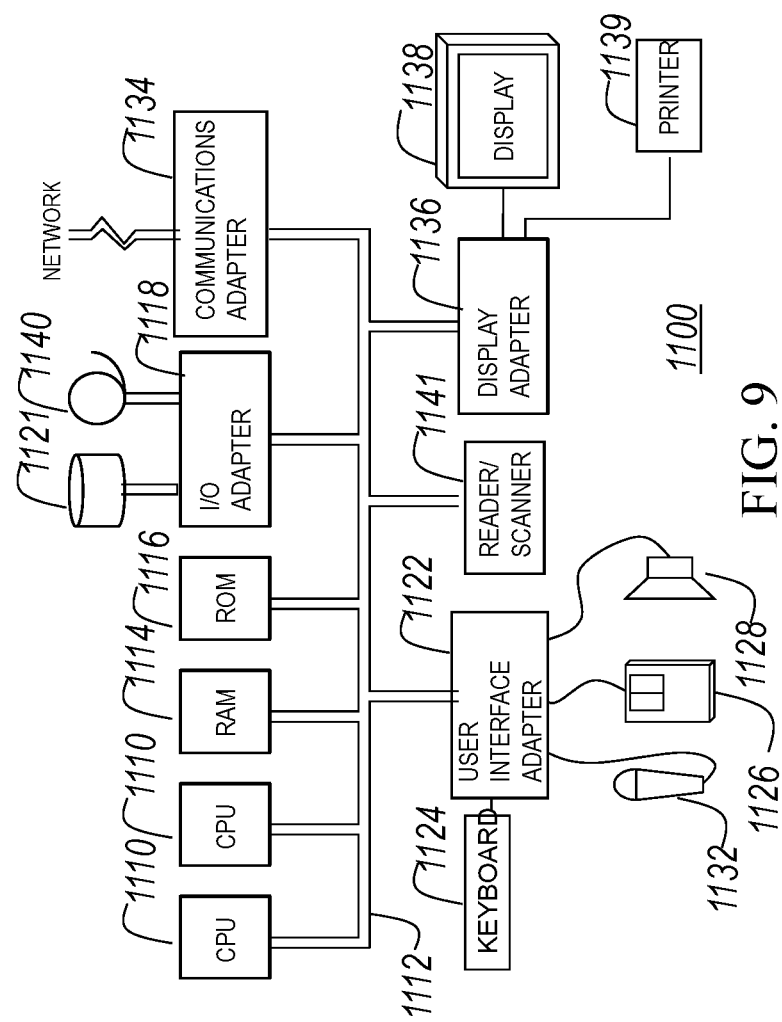
FIG. 9 illustrates an exemplary hardware/information handling system for incorporating the example embodiment of the invention therein.

FIG. 9 illustrates another hardware configuration of the system 200, where there is an information handling/computer system 1100 in accordance with the present invention and which preferably has at least one processor or central processing unit (CPU) 1110 that can implement the techniques of the invention in a form of a software program.

The CPUs 1110 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device to the bus 1112), a communication adapter 1134 for connecting an information handling system to a data processing network, the Internet, an Intranet, a personal area network (PAN), etc., and a display adapter 1136 for connecting the bus 1112 to a display device 1138 and/or printer 1139 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing storage media tangibly embodying a program of machine-readable instructions executable by a digital data processor incorporating the CPU 1110 and hardware above, to perform the method of the invention.

This signal-bearing storage media may include, for example, a RAM contained within the CPU 1110, as represented by the fast-access storage for example.

Figure 10:
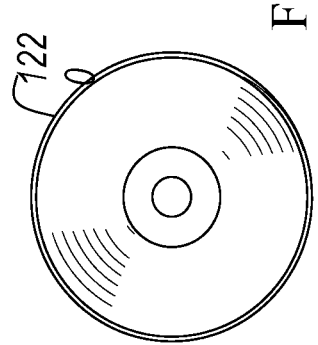
FIG. 10 illustrates a signal-bearing storage medium for storing machine-readable instructions of a program that implements the method according to the example embodiment of the invention.
Figure 10:
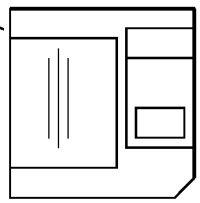

Alternatively, the instructions may be contained in another signal-bearing storage media 1200, such as a magnetic data storage diskette 1210 or optical storage diskette 1220 (FIG. 10), directly or indirectly accessible by the CPU 1210.

Whether contained in the diskette 1210, the optical disk 1220, the computer/CPU 1210, or elsewhere, the instructions may be stored on a variety of machine-readable data storage media.

Therefore, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 11:
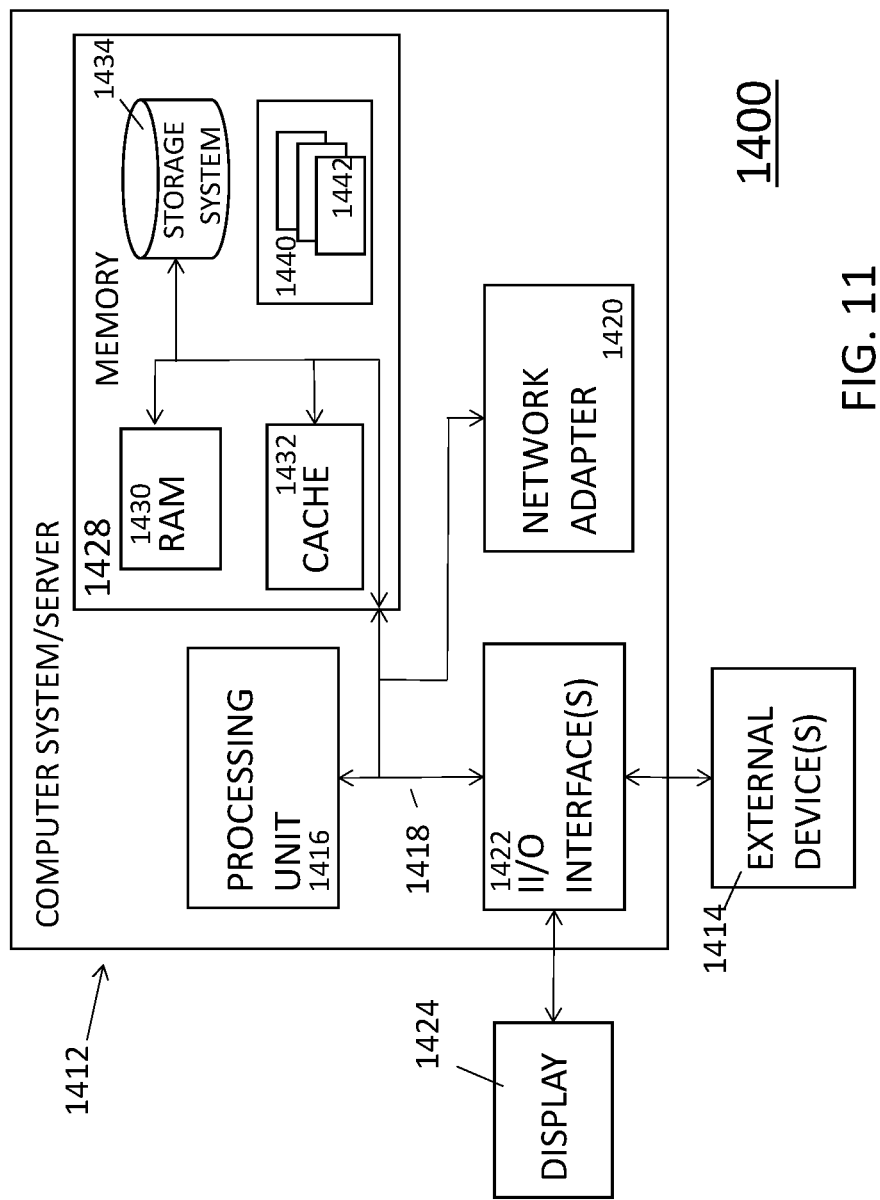
FIG. 11 depicts a cloud computing node according to an example embodiment of the present invention.

Referring now to FIG. 11, a schematic 1400 of an example of a cloud computing node is shown. Cloud computing node 1400 is only one example of a suitable cloud computing node and is not intended to suggest any limitation as to the scope of use or functionality of embodiments of the invention described herein. Regardless, cloud computing node 1400 is capable of being implemented and/or performing any of the functionality set forth hereinabove.

In cloud computing node 1400 there is a computer system/server 1412, which is operational with numerous other general purpose or special purpose computing system environments or configurations. Examples of well-known computing systems, environments, and/or configurations that may be suitable for use with computer system/server 1412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 1412 in cloud computing node 1400 is shown in the form of a general-purpose computing device. The components of computer system/server 1412 may include, but are not limited to, one or more processors or processing units 1416, a system memory 1428, and a bus 1418 that couples various system components including system memory 1428 to processor 1416.

Bus 1418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1412 typically includes a variety of computer system readable media. Such media may be any available media that is accessible by computer system/server 1412, and it includes both volatile and non-volatile media, removable and non-removable media.

System memory 1428 can include computer system readable media in the form of volatile memory, such as random-access memory (RAM) 1430 and/or cache memory 1432. Computer system/server 1412 may further include other removable/non-removable, volatile/non-volatile computer system storage media. By way of example only, storage system 1434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1418 by one or more data media interfaces. As will be further depicted and described below, memory 1428 may include at least one program product having a set (e.g., at least one) of program modules that are configured to carry out the functions of embodiments of the invention.

Program/utility 1440, having a set (at least one) of program modules 1442, may be stored in memory 1428 by way of example, and not limitation, as well as an operating system, one or more application programs, other program modules, and program data. Each of the operating system, one or more application programs, other program modules, and program data or some combination thereof, may include an implementation of a networking environment. Program modules 1442 generally carry out the functions and/or methodologies of embodiments of the invention as described herein.

Computer system/server 1412 may also communicate with one or more external devices 1414 such as a keyboard, a pointing device, a display 1424, etc.; one or more devices that enable a user to interact with computer system/server 1412; and/or any devices (e.g., network card, modem, etc.) that enable computer system/server 1412 to communicate with one or more other computing devices. Such communication can occur via Input/Output (I/O) interfaces 1422. Still yet, computer system/server 1412 can communicate with one or more networks such as a local area network (LAN), a general wide area network (WAN), and/or a public network (e.g., the Internet) via network adapter 1420. As depicted, network adapter 1420 communicates with the other components of computer system/server 1412 via bus 1418. It should be understood that although not shown, other hardware and/or software components could be used in conjunction with computer system/server 1412. Examples, include, but are not limited to: microcode, device drivers, redundant processing units, external disk drive arrays, RAID systems, tape drives, and data archival storage systems, etc.

Figure 12:
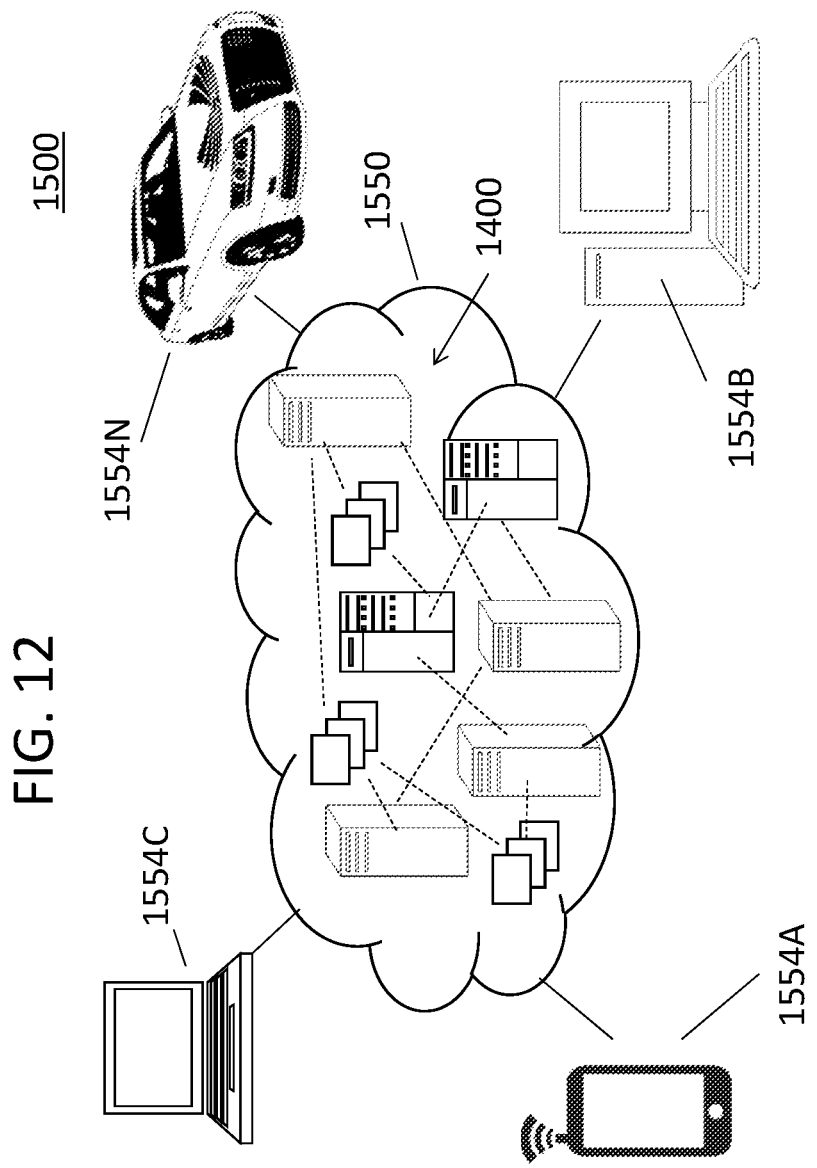
FIG. 12 depicts a cloud computing environment according to an example embodiment of the present invention.

Referring now to FIG. 12, illustrative cloud computing environment 1550 is depicted. As shown, cloud computing environment 1550 includes one or more cloud computing nodes 1400 with which local computing devices used by cloud consumers, such as, for example, personal digital assistant (PDA) or cellular telephone 1554A, desktop computer 1554B, laptop computer 1554C, and/or automobile computer system 1554N may communicate. Nodes 1400 may communicate with one another. They may be grouped (not shown) physically or virtually, in one or more networks, such as Private, Community, Public, or Hybrid clouds as described hereinabove, or a combination thereof. This allows cloud computing environment 1550 to offer infrastructure, platforms and/or software as services for which a cloud consumer does not need to maintain resources on a local computing device. It is understood that the types of computing devices 1554A-N shown in FIG. 12 are intended to be illustrative only and that computing nodes 1400 and cloud computing environment 1550 can communicate with any type of computerized device over any type of network and/or network addressable connection (e.g., using a web browser).

Figure 13:
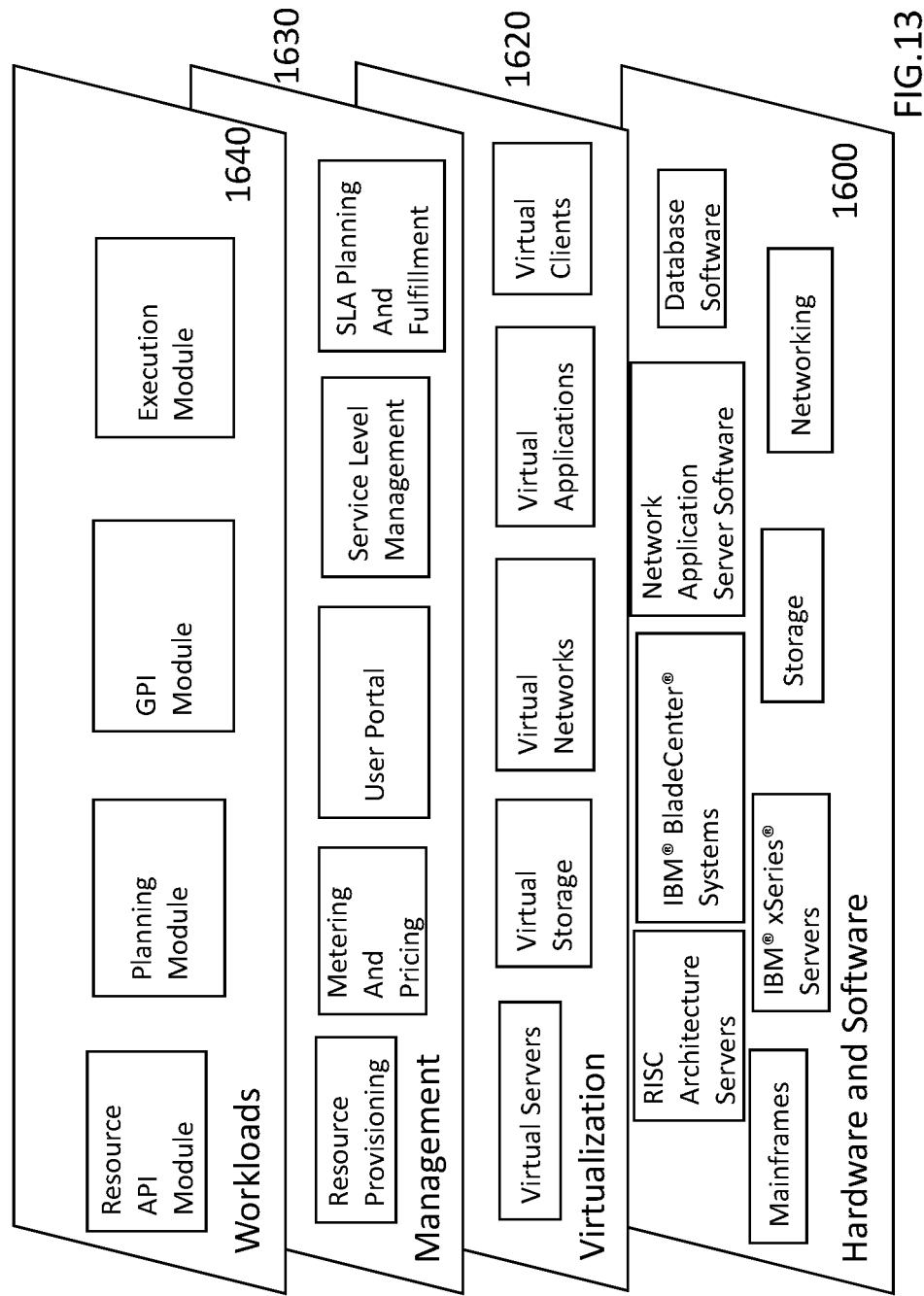
FIG. 13 depicts abstraction model layers according to an example embodiment of the present invention.

Referring now to FIG. 13, a set of functional abstraction layers provided by cloud computing environment 1550 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 1660 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide).

Virtualization layer 1662 provides an abstraction layer from which the following examples of virtual entities may be provided: virtual servers; virtual storage; virtual networks, including virtual private networks; virtual applications and operating systems; and virtual clients.

In one example, management layer 1664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1666 provides examples of functionality for which the cloud computing environment may be utilized. Examples of workloads and functions which may be provided from this layer include such functions as mapping and navigation; software development and lifecycle management; virtual classroom education delivery; data analytics processing; transaction processing; and, more particularly relative to the present invention, the APIs and run-time system components of generating search autocomplete suggestions based on contextual input.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

What is claimed is:

1. A method comprising:
enumerating a subspace of valid integrated machine learning pipelines, wherein each valid integrated machine learning pipeline integrates at least one distinct value-add via a respective machine learning pipeline transformation, wherein each valid integrated machine learning pipeline is a transformed version of same initial machine learning pipeline;
collecting a set of objective and side-effect metrics for each of the valid integrated machine learning pipelines;
reducing the set of objective and side-effect metrics to a single metric for each of the valid integrated machine learning pipelines;
ordering the valid integrated machine learning pipelines based on the single metric;
and selecting a final integrated machine learning pipeline from the valid integrated machine learning pipelines based on the final integrated machine learning pipeline having a top ranked single metric.

2. The method according to claim 1, wherein during the enumeration step, dynamically pruning machine learning pipelines from the subspace using preconditions, where pruning using preconditions includes removing any machine learning pipelines from the subspace having a metric that violates a metric range threshold.

3. The method according to claim 1, wherein during the enumerating, pruning machine learning pipelines from the subspace using a statically produced partial ordering of value-adds.

4. The method according to claim 1, wherein during the enumerating, pruning machine learning pipelines from the subspace based on a time threshold.

5. The method according to claim 1, wherein input data used to train machine learning pipelines considered for the subspace is multi-modal data from a plurality of sources, and wherein machine learning pipelines are added to the subspace by relaxing upper and lower bounds of value-add metrics until a threshold number of machine learning pipelines is met.

6. The method according to claim 1, wherein the final integrated machine learning pipeline is selected based on the top ranked single metric being on a frontier of a Pareto frontier.

7. The method according to claim 1 being cloud implemented.

8. The method of claim 1, wherein the subspace of valid integrated machine learning pipelines includes at least one valid integrated machine learning pipeline that is a direct transformation of the initial machine learning pipeline and at least one valid integrated machine learning pipeline that is a transformation of the direct transformation of the initial machine learning pipeline.

9. The method of claim 1, wherein machine learning pipeline transformations applied to valid integrated machine learning pipelines within the subspace include de-biasing, compression, and hyperparameter optimization.

10. The method of claim 1, wherein a first valid integrated machine learning pipeline is a first transformed version of the initial machine learning pipeline by a de-biasing transformation, wherein a second valid integrated machine learning pipeline is a second transformed version of the initial machine learning pipeline by a compression transformation, wherein a third valid integrated machine learning pipeline is a third transformed version of the initial machine learning pipeline by a compression transformation.

11. A system comprising:
one or more processors; and
one or more computer-readable storage media collectively storing program instructions which, when executed by the one or more processors, are configured to cause the one or more processors to perform a method comprising:
enumerating a subspace of valid integrated machine learning pipelines, wherein each valid integrated machine learning pipeline integrates at least one distinct value-add via a respective machine learning pipeline transformation, wherein each valid integrated machine learning pipeline is a transformed version of same initial machine learning pipeline;
collecting a set of objective and side-effect metrics for each of the valid integrated machine learning pipelines;
reducing the set of objective and side-effect metrics to a single metric for each of the valid integrated machine learning pipelines;
ordering the valid integrated machine learning pipelines based on the single metric;
and selecting a final integrated machine learning pipeline from the valid integrated machine learning pipelines based on the final integrated machine learning pipeline having a top ranked single metric.

12. The system according to claim 11, wherein during the enumeration step, dynamically pruning machine learning pipelines from the subspace using preconditions, where pruning using preconditions includes removing any machine learning pipelines from the subspace having a metric that violates a metric range threshold.

13. The system according to claim 11, wherein during the enumerating, pruning machine learning pipelines from the subspace using a statically produced partial ordering of value-adds.

14. The system according to claim 11, wherein input data used to train machine learning pipelines considered for the subspace is multi-modal data from a plurality of sources, and
wherein machine learning pipelines are added to the subspace by relaxing upper and lower bounds of value-add metrics until a threshold number of machine learning pipelines is met.

15. The system according to claim 11, wherein the set of objective and side-effect metrics for each valid integrated machine learning pipeline are normalized yielding a tuple of metric values for each valid integrated machine learning pipeline, wherein the set of objective and side-effect metrics are reduced to the single metric by computing a geometric mean over the tuple of metric values for each valid integrated machine learning pipeline.

16. A computer program product comprising one or more computer readable storage media, and program instructions collectively stored on the one or more computer readable storage media, the program instructions comprising instructions configured to cause one or more processors to perform a method comprising:
enumerating a subspace of valid integrated machine learning pipelines, wherein each valid integrated machine learning pipeline integrates at least one distinct value-add via a respective machine learning pipeline transformation, wherein each valid integrated machine learning pipeline is a transformed version of same initial machine learning pipeline;
collecting a set of objective and side-effect metrics for each of the valid integrated machine learning pipelines;
reducing the set of objective and side-effect metrics to a single metric for each of the valid integrated machine learning pipelines;
ordering the valid integrated machine learning pipelines based on the single metric;
and selecting a final integrated machine learning pipeline from the valid integrated machine learning pipelines based on the final integrated machine learning pipeline having a top ranked single metric.

17. The computer program product according to claim 16, wherein during the enumeration step, dynamically pruning machine learning pipelines from the subspace using preconditions, where pruning using preconditions includes removing any machine learning pipelines from the subspace having a metric that violates a metric range threshold.

18. The computer program product according to claim 16, wherein during the enumerating, pruning machine learning pipelines from the subspace using a statically produced partial ordering of value-adds.

19. The computer program product according to claim 16, wherein input data used to train machine learning pipelines considered for the subspace is multi-modal data from a plurality of sources, and
wherein machine learning pipelines are added to the subspace by relaxing upper and lower bounds of value-add metrics until a threshold number of machine learning pipelines is met.

20. The computer program product according to claim 16, wherein the set of objective and side-effect metrics for each valid integrated machine learning pipeline are normalized yielding a tuple of metric values for each valid integrated machine learning pipeline, wherein the set of objective and side-effect metrics are reduced to the single metric by computing a weighted average over the tuple of metric values for each valid integrated machine learning pipeline.

\* \* \* \* \*